United States Patent [19]
Wilson et al.

[11] Patent Number: 5,465,254
[45] Date of Patent: * Nov. 7, 1995

[54] RING-TYPE COMMUNICATION NETWORK

[76] Inventors: Philip D. Wilson, 21 Philemon Whale La., Sudbury, Mass. 01776; Richard D. Serafin, 2005 Windsor Ridge Dr., Westboro, Mass. 01581; Paul W. Kelley, 115 Spring St., Hopkinton, Mass. 01748; Tadeusz Witkowicz, 263 W. Main St., Milbury, Mass. 01527

[*] Notice: The portion of the term of this patent subsequent to Apr. 21, 2009, has been disclaimed.

[21] Appl. No.: 110,101

[22] Filed: Aug. 20, 1993

Related U.S. Application Data

[62] Division of Ser. No. 870,541, Apr. 17, 1992, Pat. No. 5,295,012, which is a division of Ser. No. 726,497, Apr. 24, 1985, Pat. No. 5,107,490.

[51] Int. Cl.$^6$ .................................................. H04J 14/08
[52] U.S. Cl. ........................ 370/79; 370/85.3; 370/85.4; 370/85.13; 359/135; 359/119
[58] Field of Search ........................ 370/79, 85.3, 85.4, 370/85.5, 85.13, 85.14, 85.15; 359/115, 119, 135–137

[56] References Cited

U.S. PATENT DOCUMENTS

| | | | |
|---|---|---|---|
| 4,677,611 | 6/1987 | Yanosy, Jr. et al. | 370/85.13 |
| 5,107,490 | 4/1992 | Wilson et al. | 370/85.3 |

*Primary Examiner*—Douglas W. Olms
*Assistant Examiner*—Russell W. Blum
*Attorney, Agent, or Firm*—Wolf, Greenfield & Sacks

[57] ABSTRACT

An optical fiber ring network carries data in frames of bit intervals that define a number of independent communication bands each represented by a series of spaced apart bit intervals no more than one of which falls within any given frame. The network serves a collision detection protocol by nodes that communicate with the user devices in accordance with the collision detection protocol but communicates with the ring in accordance with a non-collision type protocol. The network uses light that is amplitude modulated at more than two levels. The data frame boundaries are defined by violations of an alternate mark inversion data encoding technique. Phase synchronization of two streams of frames is accomplished by sampling frames at times governed by a selected one of two frame boundary clocks derived respectively from the two frames.

4 Claims, 10 Drawing Sheets

| | BAND | | | | | | | |
|---|---|---|---|---|---|---|---|---|
| | | $B_0$ | $B_1$ | $B_2$ | $B_3$ | $B_4$ | $B_5$ | $B_6$ | SF |
| FRAME | 0 | $BF_0$ | $C_{16}$ | $C_{23}$ | $C_{37}$ | $C_{47}$ | $C_{52}$ | $C_{66}$ | $SF_0$ |
| | 1 | $C_{00}$ | $C_{17}$ | $C_{24}$ | $BF_3$ | $BF_4$ | $C_{53}$ | $C_{67}$ | $SF_1$ |
| | 2 | $C_{01}$ | $BF_1$ | $C_{25}$ | $C_{30}$ | $C_{40}$ | $C_{54}$ | $BF_6$ | $SF_2$ |
| | 3 | $C_{02}$ | $C_{10}$ | $C_{26}$ | $C_{31}$ | $C_{41}$ | $C_{55}$ | $C_{60}$ | $SF_3$ |
| | 4 | $C_{03}$ | $C_{11}$ | $C_{27}$ | $C_{32}$ | $C_{42}$ | $C_{56}$ | $C_{61}$ | $SF_4$ |
| | 5 | $C_{04}$ | $C_{12}$ | $BF_2$ | $C_{33}$ | $C_{43}$ | $C_{57}$ | $C_{62}$ | $SF_5$ |
| | 6 | $C_{05}$ | $C_{13}$ | $C_{20}$ | $C_{34}$ | $C_{44}$ | $BF_5$ | $C_{63}$ | $SF_6$ |
| | 7 | $C_{06}$ | $C_{14}$ | $C_{21}$ | $C_{35}$ | $C_{45}$ | $C_{50}$ | $C_{64}$ | $SF_7$ |
| | 8 | $C_{07}$ | $C_{15}$ | $C_{22}$ | $C_{36}$ | $C_{46}$ | $C_{51}$ | $C_{65}$ | $SF_8$ |

110 ↗      112 ↘

RING-TYPE COMMUNICATION NETWORK

This application is a division of application Ser. No. 07/870,541, filed Apr. 17, 1992, now U.S. Pat. No. 5,295,012 issued Mar. 15, 1994, which is a division of application Ser. No. 06/726,497, filed Apr. 24, 1985, now U.S. Pat. No. 5,107,490 issued Apr. 21, 1992.

BACKGROUND OF THE INVENTION

This invention relates to ring-type networks for digital communication.

In ring networks, a number of nodes are interconnected by communication links to form a continuous ring. The devices (called DTEs) which use the network (for example, terminals or microcomputers) are connected to the nodes (called DCEs). Digital data is sent around the ring from node to node in a particular direction. Information to be sent from a given DTE passes via its node onto the ring, around the ring to the node of the recipient DTE, and then on to the recipient DTE.

To enable different DTEs to share the ring, protocols have been established to define the form in which digital data is sent around the ring.

For example, in token ring protocols, digital data is sent in packets. Each packet includes bits showing the source and destination of the packet together with a number of bits of data. All of the bits of a packet are carried on the ring one after the other without any intervening dead time. At a later time another related packet is sent.

In a so-called slotted ring scheme, when a node is ready to send data it seizes the first available empty packet, inserts the data into the packet, and redelivers the packet to the ring.

Tukeyama, "Major and Minor Ring Architecture Using Fiber Optics," discloses a ring network in which the communication links are optical fibers. Data is carried around the ring in frames each of which includes a fixed number of multi-bit slots. The slots which occupy the same relative position in successive frames, for example the third slot each frame, make up a 2.4 megabit per second channel.

SUMMARY OF THE INVENTION

One general feature of the invention is an optical fiber ring network on which data is carried in a succession of bit intervals, and the bit intervals define a number of available independent communication bands each represented by a series of spaced apart bit intervals.

Preferred embodiments include the following features. The bit intervals are organized into a series of frames each spanning a number of successive bit intervals, and no more than one bit interval for a given band falls in any one frame. All of the frames have the same number of bit intervals (preferably eight) and each band is made up of one-bit intervals, which appear in the same position in each frame. The bit intervals on the ring occur at 194 megahertz, and each band has a capacity of 24.25 megabits per second. One band carries bit values that indicate the beginning of each frame and the nodes around the ring synchronize themselves accordingly. One band (for example the framing band) carries network control information in a channel which includes one framing bit interval drawn from each one of fewer than all of the frames. The frames are grouped into blocks, each band includes one bit interval in each of more than one of the frames, and the different bit intervals in a given band represent different communication channels. The bands or channels can be organized into groups. Different bands or channels carry data in accordance with different communication protocols, for example a token ring protocol, or a protocol of the kind in which responses are required within a time critical interval e.g., 100 microseconds. An initiator node assures that an integral number of frames are on the ring at all times. A local loop is tied to the main ring via a wiring concentrator.

Another general feature is a network in which devices using a collision detection protocol (for example, IEEE 802.3) are served by nodes which communicate with the devices in accordance with that protocol but which communicate with the ring in accordance with a non-collision-type protocol (for example a token-ring protocol).

Preferred embodiments include the feature that the bit rate at which data can be carried on the ring is greater than the bit rate at which each node is arranged to pass data to and from the ring.

Another general feature is amplitude modulating light at more than two possible amplitude levels in accordance with the data for delivery over the optical fiber link.

Preferred embodiments include the following features. There are three possible light amplitude levels. The data is encoded by an alternate mark inversion coding technique.

Another general feature is defining the boundaries of the data frames by violation of the alternate mark inversion coding technique.

Preferred embodiments include the following features. Each frame is defined by a framing bit, and the violation of the coding technique is imposed on fewer than all of the framing bits, for example in every 64th frame.

Another general feature is phase synchronizing two streams of frames by deriving frame boundary clocks corresponding to the two streams, and selecting one or the other clock to control the sampling of frames based on the magnitude and direction of the phase error between the streams.

Preferred embodiments include the following features, when the phase error shifts, the other frame boundary clock is not selected until the phase error shift exceeds a particular threshold.

The network provides a number of independent, universal bands and channels, each of which can be assigned to carry data in accordance with any selected data communication protocol. The channels and bands can be combined and recombined to provide a variety of different bandwidths. Different channels and bands can simultaneously serve different protocols. Protocols such as 3270 and others which are time critical, can be served since each channel provides an available 2.694 megabit per second capacity and includes bit intervals that appear no less frequently than every 72nd bit. Th network can markedly enhance the performance of single-session type bus protocols (e.g., Ethernet CSMA/CD) by permitting high data rate communication of several messages at the same time. By handling network management control in a channel that is outside the data carrying bands, the band protocol demands are simplified and the network allows greater flexibility. Multiple level light modulation provides good DC balance and enables using a simple violation of the code to define frame boundaries. Phase synchronization accomodates variations caused by temperature and component delays. The hysteresis imposed by the phase synchronization limits continual, non-essential switching of sampling clocks.

Other advantages and features of the invention will become apparent from the following description of the preferred embodiment, and from the claims.

DESCRIPTION OF THE PREFERRED EMBODIMENT

We first briefly describe the drawings.

Drawings FIG. 1 is a diagram of a ring network.

STRUCTURE AND OPERATION

Figure 1:
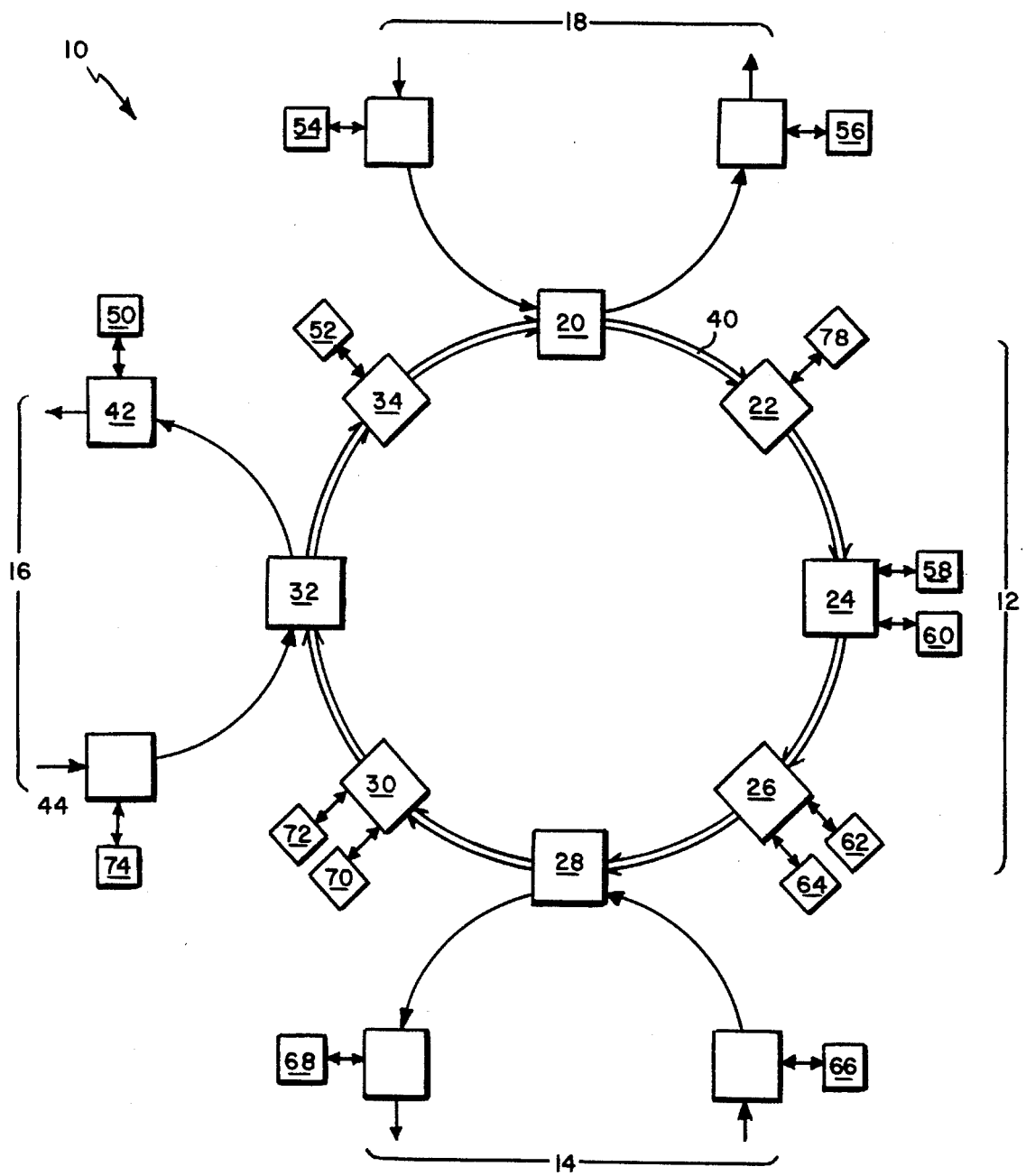

Referring to FIG. 1, communications network 10 includes a main ring 12 and one or more local loops 14, 16, 18. Main ring 12 includes main ring nodes 20 through 34 which are interconnected by optical fiber links 40 to form a continuous closed communication ring. Data is sent around the main ring in one direction (clockwise in the case of FIG. 1) at a serial rate of 194 megabits per second.

Each local loop similarly has local loop nodes 42 interconnected by local loop links 44 to form a continuous closed local loop. The local links may be optical fibers or other narrower bandwidth media such as coaxial cable.

Network 10 serves data terminal equipment devices (DTEs) 50 through 74, each of which is connected via an input/output port to a node for sending and receiving digital data via the network in accordance with a specific communication protocol, for example IBM 3270, or ANSI/IEEE 802.3 (Ethernet).

There are several different types of main ring nodes.

Wiring concentrator nodes 20, 28, 32 tie the main ring to the local loops to form a single communication network. Each wiring concentrator node routes at least some of the data from the main ring to its local loop and returns data from the local loop to the main ring.

A network management controller (personal computer) 78 which supervises the operation of the network is connected to a node (e.g., node 22). Stored on a disk of the network management controller is management control data such as the locations of all nodes in the network, their types, error statistics, etc. Different nodes are capable of supporting the network management controller.

Ethernet accelerator nodes, for example nodes 26, 42, serve and provide enhanced communication capacity to DTEs which use the Ethernet protocol.

One of the nodes, for example node 30, is an initiator node which synchronizes the delivery of data around the main ring. Different nodes are capable of serving as the initiator node; the choice is dictated by a contention algorithm in which microprocessors in the nodes contend as peers by asserting their respective serial numbers, and the node having the highest (unique) serial number then serves as the initiator.

Other types of nodes may also be part of the network, including nodes to serve other types of protocols and nodes to provide bridges and gateways between protocols.

Figure 2:
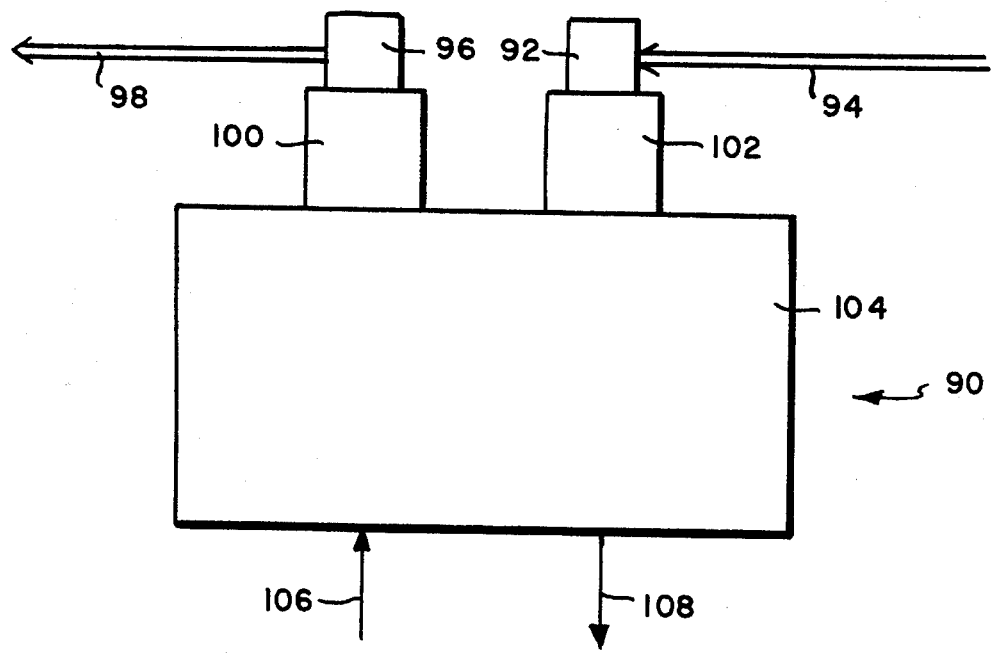
FIG. 2 is a diagram of a node.

Referring to FIG. 2, each main ring node 90 includes a photodiode 92 which senses light signals that appear on an input optical fiber link 94, and a light emitting diode (LED) 96 which sends light signals over an output optical fiber link 98. LED 96 and photodiode 92 are connected respectively via an LED driver circuit 100 and a photodiode detector circuit 102 to node circuitry 104.

Node circuitry 104 has data input and output lines 106, 108 connected to receive and send data to one or more DTEs, to the network management controller, or to a local loop, as the case may be.

Figure 3:
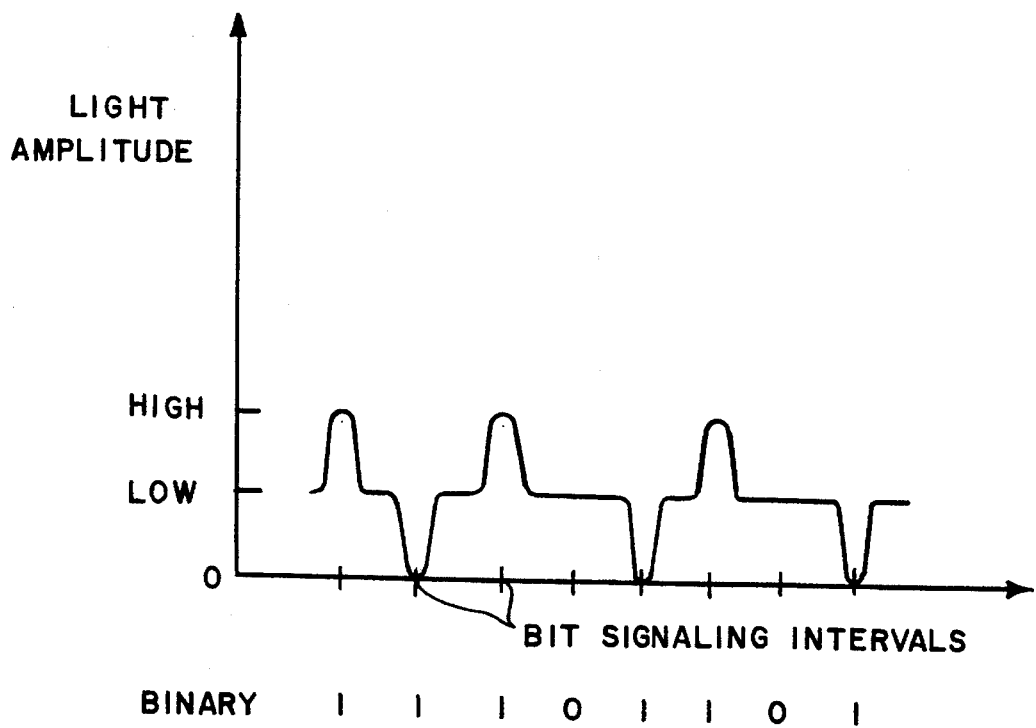
FIG. 3 is a chart of AMI encoding.

Referring to FIG. 3, digital data bits are carried on links 40 using three-level light amplitude modulation in accordance with an alternate mark inversion (AMI) coding technique. The three levels of light are "off", "medium", and "high". In each bit signaling interval of approximately 5 nanoseconds, the light level is set "medium" to send a "0" bit, or is set either "off" or "high" to send a "1" bit. The choice between "off" and "high" is made in such a way that successive "1" bits are sent by alternate "off" or "high" light levels. FIG. 3 shows the bit values corresponding to one particular light level sequence.

Figures 4, 5:
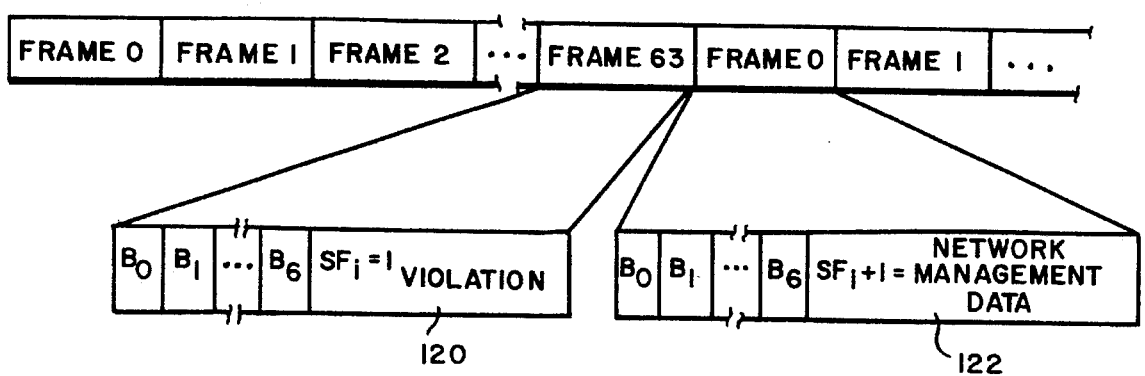
FIG. 4 is a chart of a block of frames of bit intervals
FIG. 5 is a diagram illustrating the network management channel.

Referring to FIG. 4, digital data is carried serially on the main ring in successive blocks, each block 110 containing 72 bits 112 organized as nine successive system frames (represented respectively by the nine rows of the chart in FIG. 4) of eight bit intervals each. Each system frame includes one so-called system framing bit SF (the bit in the eighth position in the frame), and seven data bits, for example bit $C_{16}$. Thus the 194 megabit per second capacity of the main ring is effectively divided into eight independent 24.25 megabit bands (represented by the eight columns of the chart of FIG. 4). The eight bands consist of a system framing band SF (which carries the framing bits as well as network management bits described below) and seven information bands $B_0$ to $B_6$ which carry data among the DTEs served by the network.

Each band consists of a succession of band frames, one band frame in each block, each band frame being nine bits long. For example, FIG. 4 shows one band frame (for band $B_1$) made up of the second bits of each of the nine system frames in the block shown. The next band frame for the band $B_1$ would begin with the second bit of the first system frame in the next block. Each band frame is divided into nine channels corresponding to the nine bit positions in the band frame. For example, the fourth bit of system frame 3 for each block represents a 194/72=2.694 megabit channel (denoted $C_{30}$). One of the channels carries a succession of band framing bits $BF_0$ and the other channels carry data. Each band can also be utilized in a manner which does not use any band framing bits.

The channels and bands serve as data highways that can be allocated and reallocated at any time by the network management controller so that any channel or channels and any band or bands can implement any desired communication protocols and can serve any desired combination of DTEs and local loops. For example, at a given time band $B_1$ could be allocated to implement a 3270 protocol to serve DTEs 52, 62, 72, while bands $B_2$, $B_3$ could together implement an Ethernet protocol to serve DTE's 50, 74, and 56. (Note, however, that bands $B_2$, $B_3$ would not then include band framing bits or separate channels.) Furthermore, the network management controller can dictate to the wiring concentrator nodes which bands are to be routed around which local loops. For example, band $B_0$ may be routed around loop 12, while bands $B_1$ and $B_2$ are routed around loop 14 (FIG. 1). When groups of bands are being allocated to an Ethernet, or other high bandwidth protocol, all such bands must be routed together to any local loops which use the service provided by those bands.

Referring to FIG. 5, to assure that all of the main ring nodes will properly recognize the beginning of each system frame, a system framing bit having a logical AMI "1" value is encoded as every eighth bit on the main ring (represented by the system framing bits SF, in FIG. 4) except that within every cycle of 64 system frames, the 63rd and 64th such eighth bits are treated specially. Every 63rd eighth bit (reference numeral 120 in FIG. 5) is encoded as an AMI violation "1" bit. For example if proper AMI coding would require the 63rd eighth bit to be represented by a "high" value, it will instead be represented by an "off" value. The 64th eighth bits (reference numeral 122 in FIG. 5) are used to carry network management control data and thus represent a 0.3789 megabit network management control channel.

The initiator node (for example, node 30) is arranged to perform two principal network system functions (in addition to the usual function of serving as a main ring node for connecting DTEs to the main ring). The first function is to define the boundaries of each system frame by inserting the appropriate system framing bits SF at eight bit intervals and to define the location of the network management control channel by encoding the AMI violation bits in the 63rd system frame of every cycle of 64 system frames. The second function is to synchronize the delivery of the successive bits of each system frame and of the successive system frames to the main ring in such a way that each system frame follows the preceding frame immediately and all bits on the main ring are spaced at even intervals. This second function is accomplished by assuring that the total number of system frames that are on the main ring at a given time is integral (no fractional frame), regardless of the variable length of time it takes system frames to run completely around the ring. That length of time will vary with temperature conditions, the number and types of nodes on the ring, the fiber length, and other factors.

Figure 6:
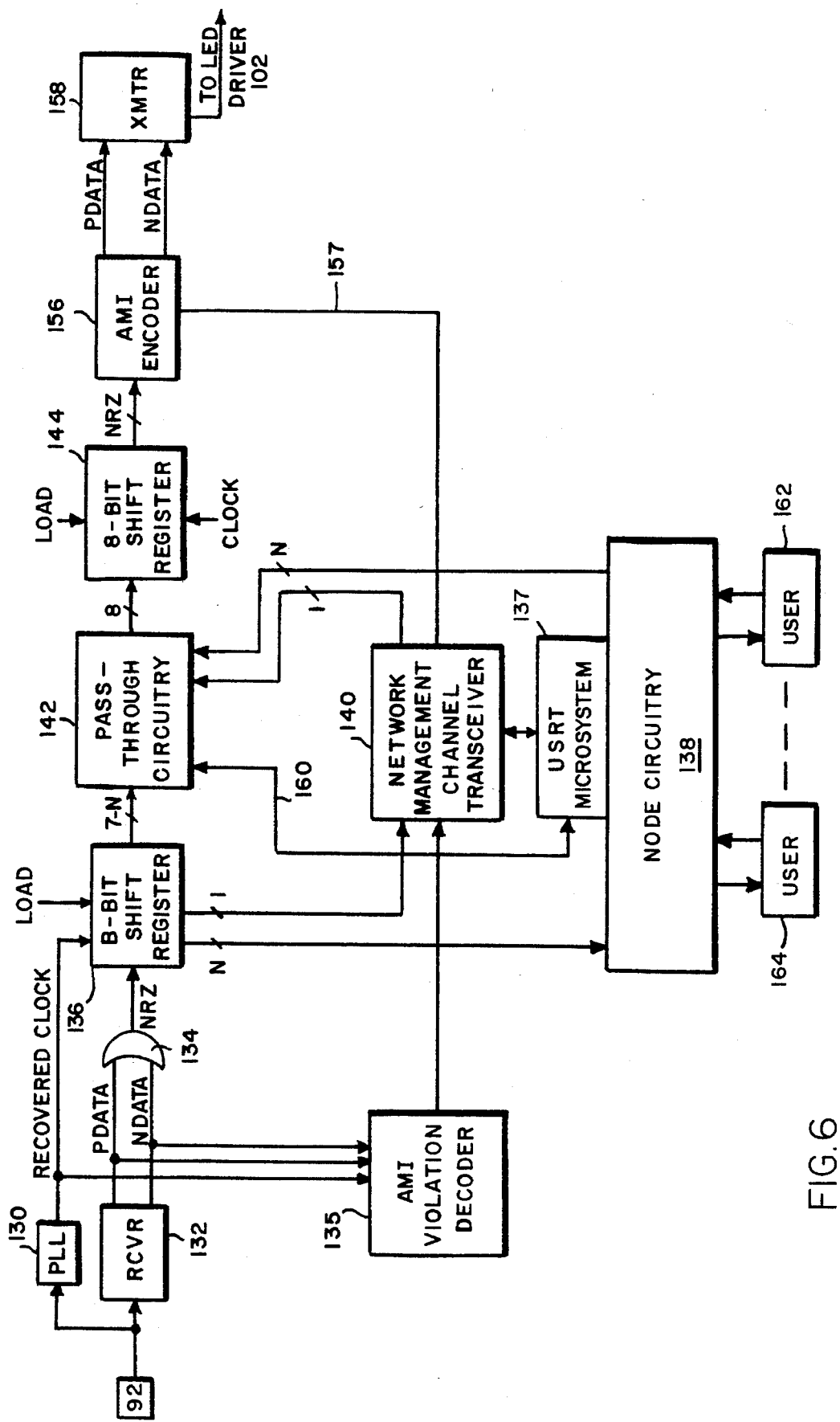
FIG. 6 is a data path block diagram of node circuitry.

Referring to FIG. 6, in every type of main ring node, the AMI encoded bit stream from the photodiode detector is fed to a phase locked loop 130 (which senses the intervals at which the bits are received and generates a corresponding recovered clock) and to a receiver 132 (which provides a high signal on the PDATA output line for each "high" level AMI bit, a high signal on the NDATA output line for each "off" level AMI bit, and low signals on both the PDATA or NDATA lines for each "medium" level AMI bit). The PDATA and NDATA signals are combined in an OR gate 134 to generate a single bi-level bit stream of the non-return-to-zero (NRZ) form. The NRZ bits are clocked into an 8-bit shift register 136 by the recovered clock. When the bits in the shift register 136 comprise all eight bits of a system frame (as determined in a manner described below), a load signal is sent to shift register 136 which causes N bits of the system frame to be delivered to other node circuitry 138 for further processing. At the same time, the system framing bit is sent to a network management channel transceiver 140, and the remaining 7–N of the bits are delivered via pass-through circuitry 142 in parallel to an 8-bit output shift register 144. The PDATA and NDATA signals are also sent to an AMI violation decoder which detects the apperance of the AMI violation system framing bits and tells the transceiver 140 to accept the next system framing bit as part of the network management control channel. N bits are also delivered from node circuitry 138 via pass-through circuitry 142 to register 144, and one management channel bit is delivered every 64th frame from transceiver 140 via pass-through circuitry 142 in parallel to register 144. Pass-through circuitry 142 interleaves the N bits, the one network management bit (when it occurs), and the 7–N bits in the proper order to form a system frame, and delivers them to shift register 144 in accordance with a load signal to shift register 144. The resulting system frame which then resides in register 144 is clocked serially to an AMI encoder 156. Encoder 156 converts the NRZ bits to streams of PDATA and NDATA signals in accordance with AMI coding, adds a framing bit to each one of th 63 frames other than the one which carries the network management control channel, tells the transceiver 140 over line 157 when to pass the network management control bits to circuitry 142 and delivers the resulting PDATA and NDATA signals to a transmitter 158 which provides a three-level AMI signal train to the LED driver.

Node circuitry 138 is connected to one or more network users 162, 164, which can be, for example, DTEs or, in the case of wiring concentrators, local loops. The N bits which are delivered to node circuitry 138 are those bits in each system frame that represent bands which are to be used via that node. For example if a node serves a DTE which uses a 3270 protocol, the bit in each band frame corresponding to the channel that has been assigned to serve the 3270 protocol is routed to circuitry 138 which provides the usual interface to the DTE in accordance with the requirements of that protocol.

The choice of which N bands are routed to the node circuitry are specified by the network management controller based on the desired network topology and installed services. At the time the system is configured, the network management control channel carries set parameter commands to each node to set up the network in accordance with the desired network topology and installed services. Each node acts on those parameter commands by configuring itself to route the various bands accordingly and to serve the respective DTEs via the appropriate bands using the specified protocols.

Network management channel transceiver 140 receives the system framing bits, and treats every 64th system framing bits as a network management control channel. Transceiver 140 accumulates successive control channel bits, converts them to clocked NRZ data, and provides them to node circuitry 138 via a communications USRT microsystem 137. Transceiver 140 also receives management control characters provided by node circuitry 138, and delivers the corresponding bits to pass-through circuitry 142 at appropriate times for inclusion in every 64th system framing bit. The control characters are selected, interpreted, and transmitted all in accordance with an appropriate distributed access network control protocol. Microsystem 137 is arranged to interpret the network control characters, to provide control signals to node circuitry 138, and over a line 160 to pass-through circuitry 142, to receive status signals from circuitry 138 and circuitry 142, and to deliver control characters back to transceiver 140 for inclusion in the control channel.

The protocol is a modified token ring protocol. When no node is transmitting network management control information, i.e., when the network control channel is quiescent, any nodes which want to use the channel contend for access in accordance with a hierarchy established by their node addresses. The winning node then sends a claim token around the ring followed by network management control information. When finished, it sends a token around the ring which can then be seized by another node waiting to send network management control information. If no other node wants to use the token it returns to the originator, the network management control channel is returned to the quiescent state, and the process is repeated. On the other hand, the token can be used by other nodes and continues to be used until no nodes wish to send network management control information; then the quiescent state is assumed again.

Accordingly, the network management control transceivers and microsystems in the main ring nodes and the network management controller cooperate to control the operation of the network.

Figure 7:
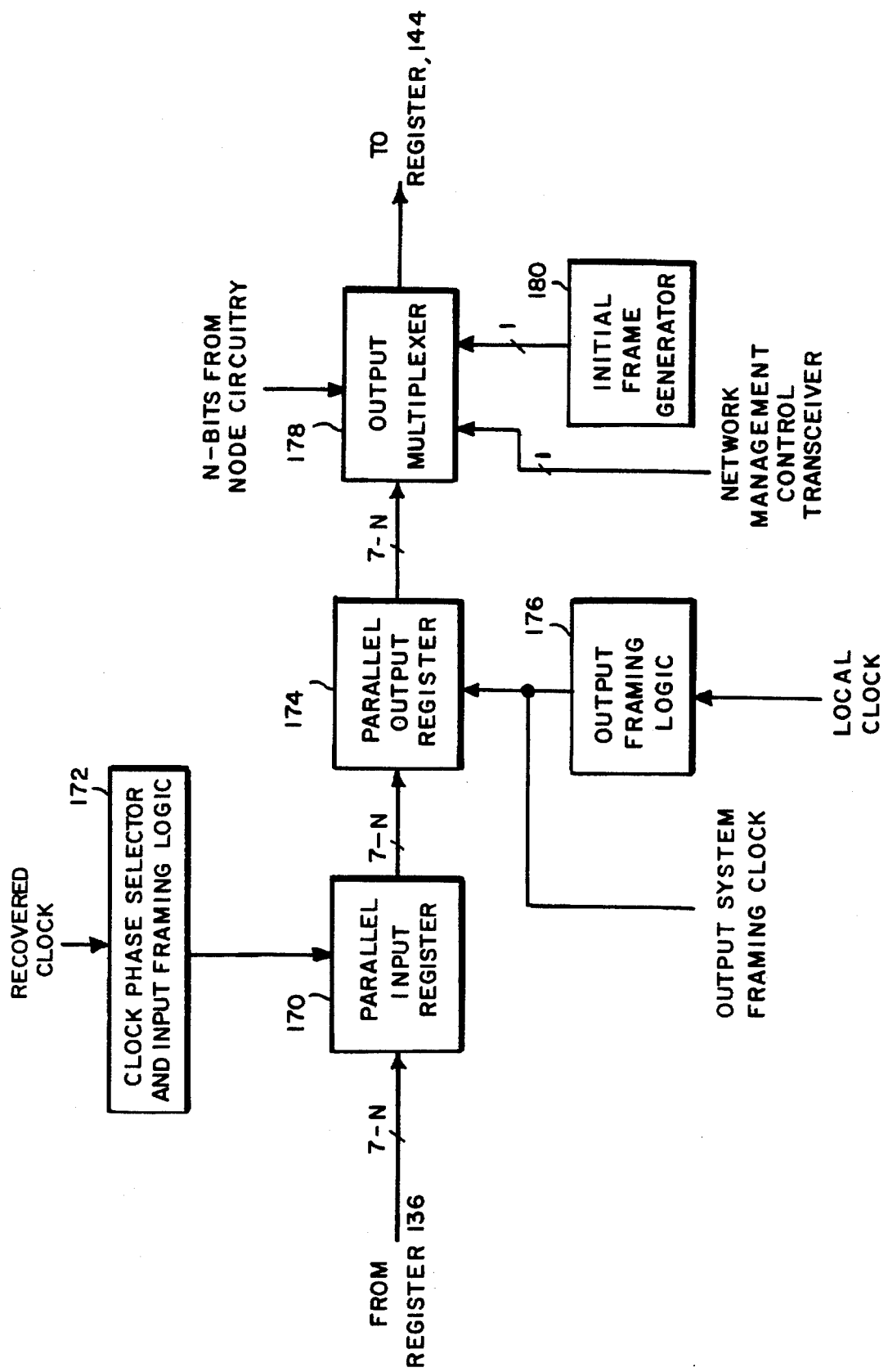
FIG. 7 is a block diagram of pass-through circuitry in an initiator node.

Referring to FIG. 7, for an initiator-type node, the pass-through circuitry 142 includes a parallel input register 170 which is loaded with the 7–N bits in each system frame held in register 136. The loading is triggered at the time when register 136 holds all of the bits of a system frame by a load signal from a clock phase selector and input framing logic 172 based on recovered clock pulses from PLL 130 and on the information carried in the system framing bits. The 7–N bits in parallel input register 170 are shifted to a parallel output register 172 by a load signal from output framing logic 176 at times which will assure that an integral number of system frames are on the main ring at a given time. To do this the output framing logic 176 receives a local clock operating at 194 megahertz and divides by 8 to give the load signals. Thus, in the initiator mode, if the incoming system frames arrive at the parallel input register 170 at times which are out of synchronism with the load signals from the output framing logic, the resulting slack time is simply taken up by the delay between each load signal to the parallel input register 170 and the next load signal to the parallel output register 172. Thus incoming system frames are stuffed into the parallel input register as they arrive but are shifted over to the parallel output register only in synchronism with the local clock, assuring the desired integral number of system frames on the main ring.

The 7–N bits are then delivered via output multiplexer 178 to register 144, together with N bits from the node circuitry and either one system framing bit generated by an initial frame generator 180, or one network management control channel bit from transceiver 140, as the case may be.

The N bits from node circuitry 138 represent the data bits of the same N bands which were routed from the 8-bit shift register 136, all encoded in accordance with the protocols assigned to those bands. The output multiplexer 178 interleaves the 7–N bits from register 172, the N bits from the node circuitry, and the one system framing band bit so that they occupy the same relative positions within the system frame. For example if band $B_1$ was routed by register 136 to the node circuitry, then the second bit of every system frame is so routed, and the output multiplexer places the bits received from the node circuity in the second bit positions of successive outgoing system frames.

Because the N bands delivered to the node circuitry may take longer to be returned to output multiplexer 178 than the time it takes for the 7–N bands to pass from register 136 to output multiplexer 178, the registration of the respective bits in the 7–N bands versus the N bands for a given block may well be shifted. For example, referring again to FIG. 4, at the input to the initiator node, band $B_2$ may have the indicated registration relative to band $B_3$, that is the band framing bit $BF_2$ for band $B_2$ occurs in system frame 5 of each block, while the band framing bit $BF_3$ for band $B_3$ occurs in system frame 1 of the block. However, at the output of the initiator node, band $B_2$ may be shifted relative to band $B_3$ so that band framing bit $BF_2$ occurs in system frame 7 of each block. The relative order of the bits within each band will remain unchanged. For example, in band $B_2$ the channel bit $C_{20}$ will always follow the framing bit $BF_2$. (Note, however, that all bands are not necessarily orgainzed into channels.) When two bands are used together to serve for example an Ethernet protocol, the bands are always routed together to the same nodes, DTE's, and local loops in order to prevent any shift in registration between the two bands.

The clock phase selector and input framing logic 172 is arranged to determine the boundaries of each system frame and to maintain the phase synchronism between the start of each system frame which comes into the initiator node and the start of each system frame which leaves the initiator node.

Figure 8:
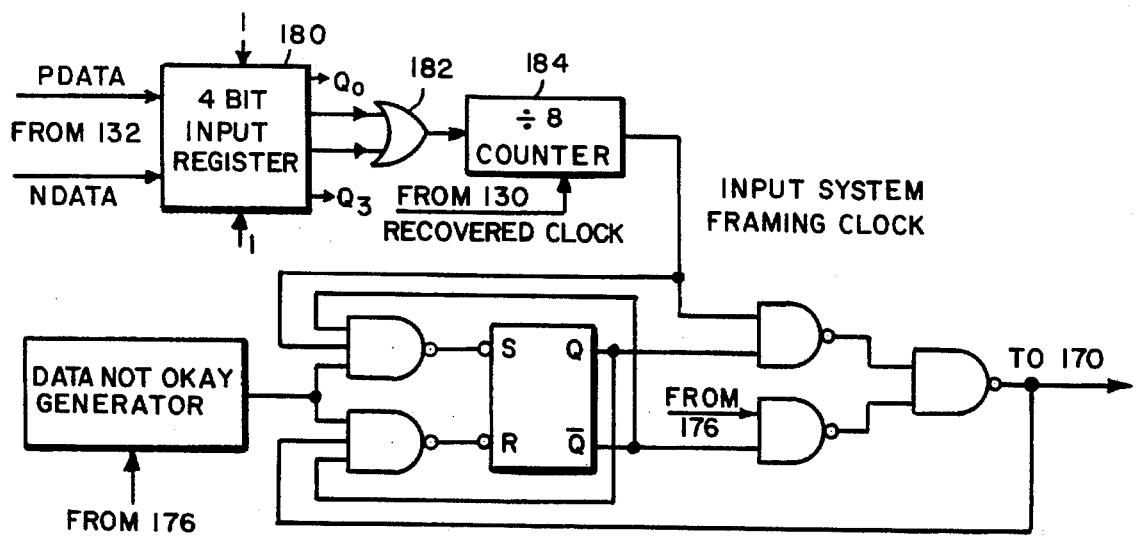
FIG. 8 is a block diagram of clock phase selector and framing logic.

Referring to FIG. 8, in logic 172 the PDATA and NDATA signals are fed from receiver 132 respectively to the shift left and shift right inputs of a 4 bit shift register 180. The data inputs on opposite sides of register 180 are both hard-wired to be always at a "1" level. The two center outputs of register 180 are connected to the inputs of an OR gate 182. As long as no violation of the AMI coding occurs, the PDATA and NDATA signals will alternately be "1's" and a "1" bit will be alternately shifted into and out of the left-most and right-most bit positions of register 180. When an AMI violation occurs, a 1 bit is shifted into one of the center bit positions and the output of OR gate 182 will be a "1" bit. In normal operation, the AMI violations, which are deliberately imposed every 64th frame, will each trigger an output bit from gate 182. The output of OR gate 182 is connected to the reset input of a divide-by-8 counter 184 which is clocked by the recovered clock from PLL 130. The output of counter 184 thus represents a recovered input system framing clock which is re-synchronized once every 64 frames.

The other circuitry of FIG. 8 assures that the input system framing clock pulses derived from the system frames received by the initiater node are synchronized with the boundaries of the outgoing system frames sent by the initiator node in the same manner as described below with respect to similar synchronizing circuitry in a wiring concentrator node.

Figure 9:
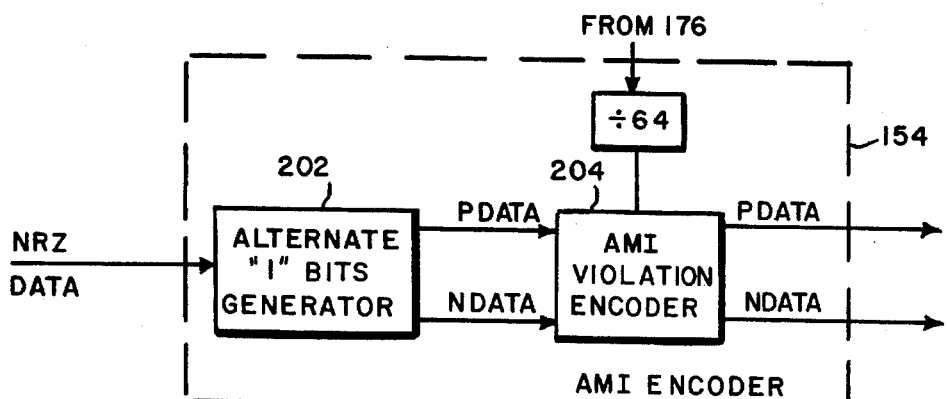
FIG. 9 is a block diagram of an AMI encoder.

Referring to FIG. 9, in the initiator node, the AMI encoder 154 includes an alternate "1" bits generator 202 (which converts the incoming NRZ data into properly AMI encoded PDATA and NDATA signals) and an AMI violation encoder 204 (which switches each 64th system framing bit from PDATA to NDATA or vice versa, based on a divide-by-64 version of the output system framing clock from logic 176).

Figure 10:
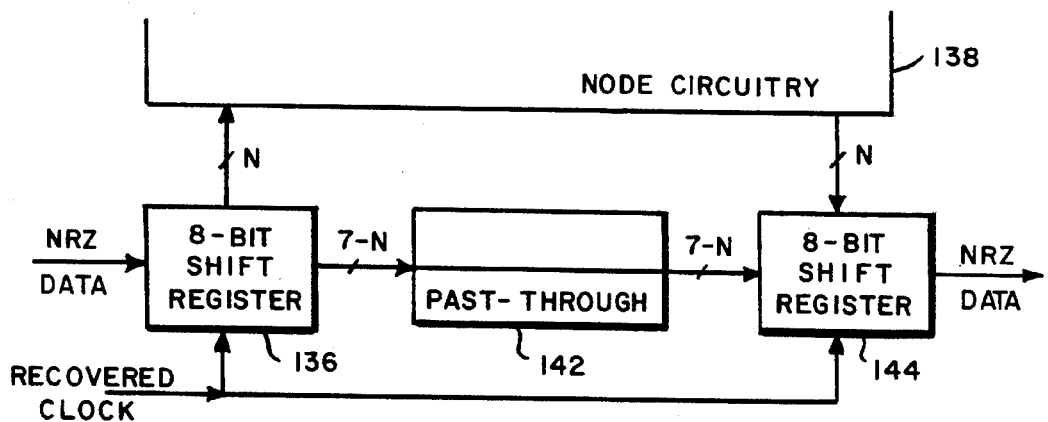
FIG. 10 is a block diagram of a simple non-initiator node.

Referring to FIG. 10, in simple main ring nodes which are not serving as the initiator node, pass-through circuitry 142 simply passes the 7–N bands directly from register 136 to register 144 in accordance with recovered clock pulses.

Figure 11:
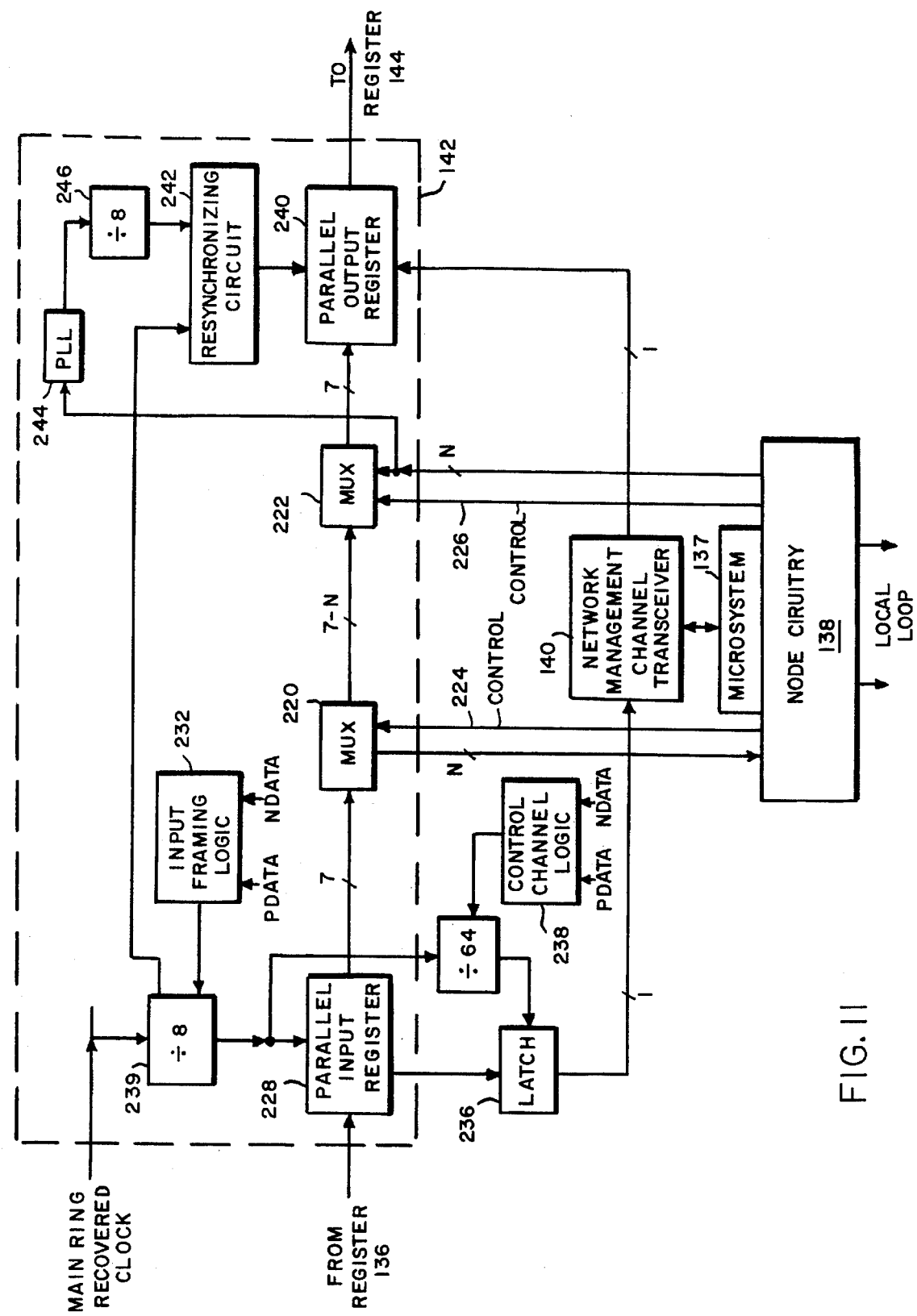
FIG. 11 is a timing path block diagram of a wiring concentrator node.

Referring to FIG. 11, the pass-through circuitry 142 in each wiring concentrator node is arranged to pass through 7–N bands of data (the 7–N bands which are not intended to be delivered to the local loop), to send N bands via the local loop by way of node circuitry 138, and to receive and send the network management control channel via transceiver 140. The routing of the 7–N bands and the N bands is controlled by the two multiplexers 220, 222. The number and identities of the bands which are routed to the local loop are determined by control signals sent over lines 224, 226 from node circuitry 138 based on the network management control information received via transceiver 140.

Multiplexer 220 is fed from a parallel input register 228 which in turn is loaded from register 136 at times determined by the output pulses of a divide-by-8 unit 230. The input of unit 230 is the main ring recovered clock and the timing of the output pulses of unit 230 is governed by pulses from input framing logic 232. Input framing logic 232 uses the main ring PDATA and NDATA signals to determine the boundaries of the system frames using circuitry like register 180, gate 182, and counter 184 (FIG. 8). Thus the output of divide-by-8 unit 230 is a recovered system framing clock. That recovered system framing clock is fed through a divide-by-64 unit 234 to generate a recovered network management control clock which enables a latch 236 to capture the network management control channel bits for delivery to transceiver 140. The timing of the output pulses of unit 234 are governed by a control channel logic 238 which watches the PDATA and NDATA signals to identify AMI violations in the same manner as shown in FIG. 8.

Multiplexer 222 shifts the 7 bits of each system frame into a parallel output register 240 at times governed by system framing signals delivered from a resynchronizing circuit 242. The purpose of resynchronizing circuit 242 is to choose an appropriate clock on which to base the system framing signals in order to accommodate the fact that the N bits coming back from the local loop may not be in phase synchronism with the 7–N bits which were passed through. Thus the unload signal should not be delivered to the parallel output register until all 8 bits for a system frame have been loaded in.

The choice made by circuit 242 is between two recovered system framing clocks, one recovered from the main ring via divide-by-8 unit 230, the other recovered from the local loop via a phase locked loop 244 and a divide-by-8 unit 246.

Figure 12:
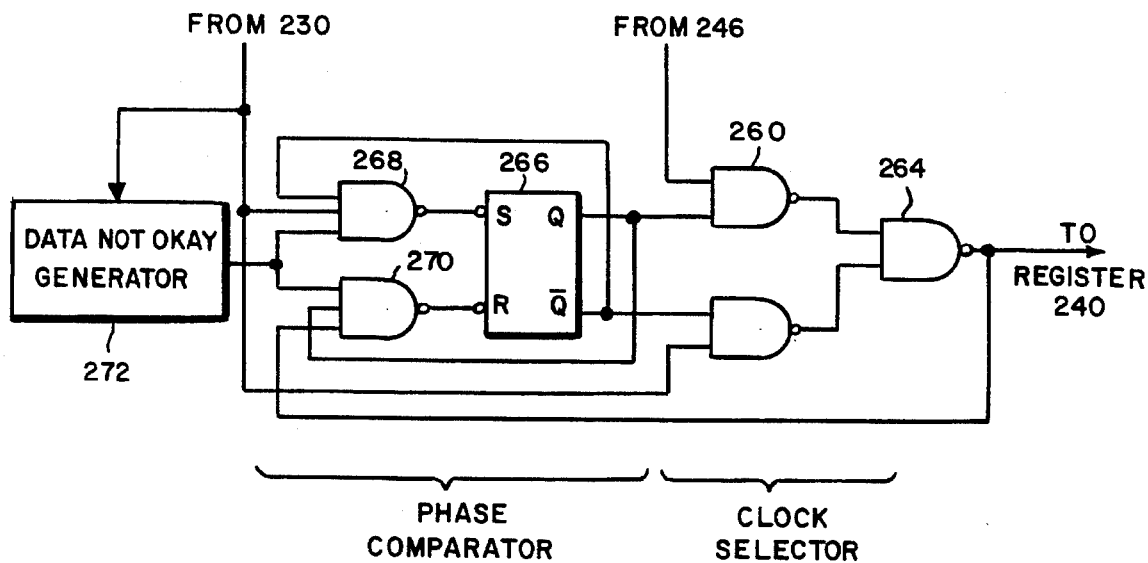
FIG. 12 is a block diagram of phase synchronism circuitry in a wiring concentrator.

Referring to FIG. 12, the two recovered system framing clocks are fed respectively to two NAND gates 260, 262. The outputs of both NAND gates 260, 262 are connected to a NAND gate 264 whose output is connected to register 240. Gates 260, 262 also have inputs taken respectively from the Q and not-Q outputs of a flip flop 266 so that the choice of which of the two recovered clocks is actually passed to register 24 depends on the state of flip flop 266. Flip flop 266 together with two NAND gates 268, 270 (which respectively feed the set and reset inputs of flip flop 266) form a phase comparator which compares the phases of the two recovered clocks. If the phase difference is between −45 degrees and +135 degrees, the not-Q output of flip flop 266 will be set high and the Q output set low, thus delivering the local loop recovered clock to register 240. With Q set low, feedback to gate 270 will inhibit any reset signal at least until the phase difference shifts well outside the −45 to +135 degree range. This assures a small amount of hysteresis such that the clock selector gates 260, 262 will not toggle back and forth when the phase difference is on the borderline between the two ranges. Without hysteresis, data could be repeatedly lost on the main ring. When the phase difference exceeds −45 degrees or +135 degrees the output of gate 268 will pulse low. When this occurs flip flop output Q is set high which will select the main ring recovered clock. The Q output is fed back to inhibit any further pulses from gate 268, thus providing the same hysteresis effect for the main ring recovered clock. Hysteresis is needed to prevent continual phase changes as system parameters drift.

Data not okay generator 272 provides pulses which begin 45° ahead of the beginning of each system frame and end 45° following the end of each system frame, based on the main ring system frame recovered clock.

Figure 13:
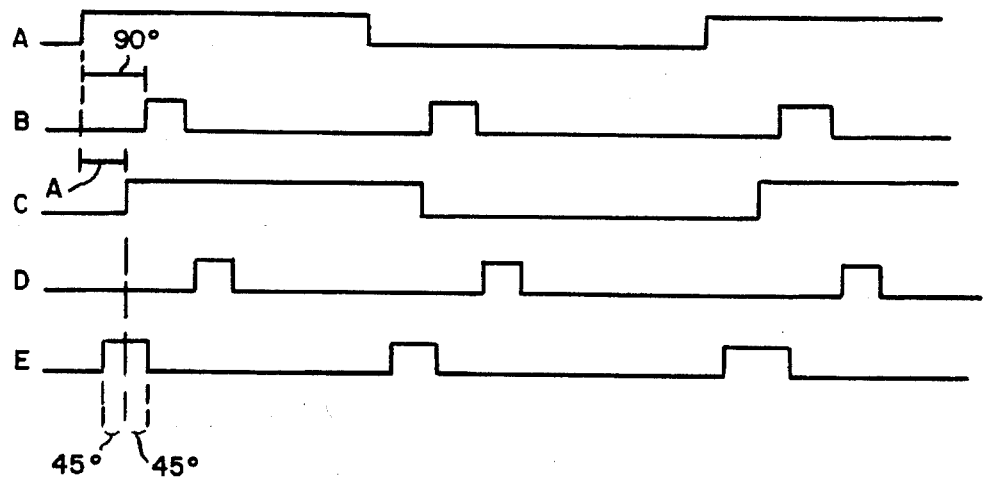
FIG. 13 is a timing chart for FIG. 12.

Referring to FIG. 13, FIG. 13A shows the system framing intervals on the main ring. FIG. 13B shows the main ring system framing clock pulses, which are caused to lag the system framing boundaries by 90°. FIG. 13C shows the local loop framing intervals, which lag the main ring framing intervals by a value A. FIG. 13D shows the corresponding local loop framing clock pulses, which are caused to lag the local loop framing boundaries by 90°. The 90° lags are such that the phase comparator output signal is wide enough to reliably operate the logic elements that follow it, but narrow enough to provide hysteresis with respect to the circuit's operating margins. FIG. 13E shows the intervals during which the local loop system frame may not be safely sampled from register 240. This interval, called DATA NOT OKAY, spans 45° on either side of the corresponding transition between successive local loop system frames. Therefore, for the situation shown in FIG. 13, using the clock pulses of FIG. 13B to unload register 240 could result in an error with respect to the N bits received from the local loop. However, using the clock pulses of FIG. 13D would avoid errors with respect to both the 7–N bits being passed through and the N bits from the local loop. Conversely there are phase difference situations in which only the main ring clock of FIG. 13B can be used for clocking while avoiding the DATA NOT OKAY intervals.

Referring again to FIG. 8, in the case of the initiator node, the phase synchronization circuit operates in a similar manner to FIGS. 12, 13 except that the two framing clocks from which the synchronization circuit selects a clock for delivery to register 170 (FIG. 7) are an output system framing clock derived from a local clock and an input system framing clock derived from a recovered clock generated by PLL 130.

Figure 14:
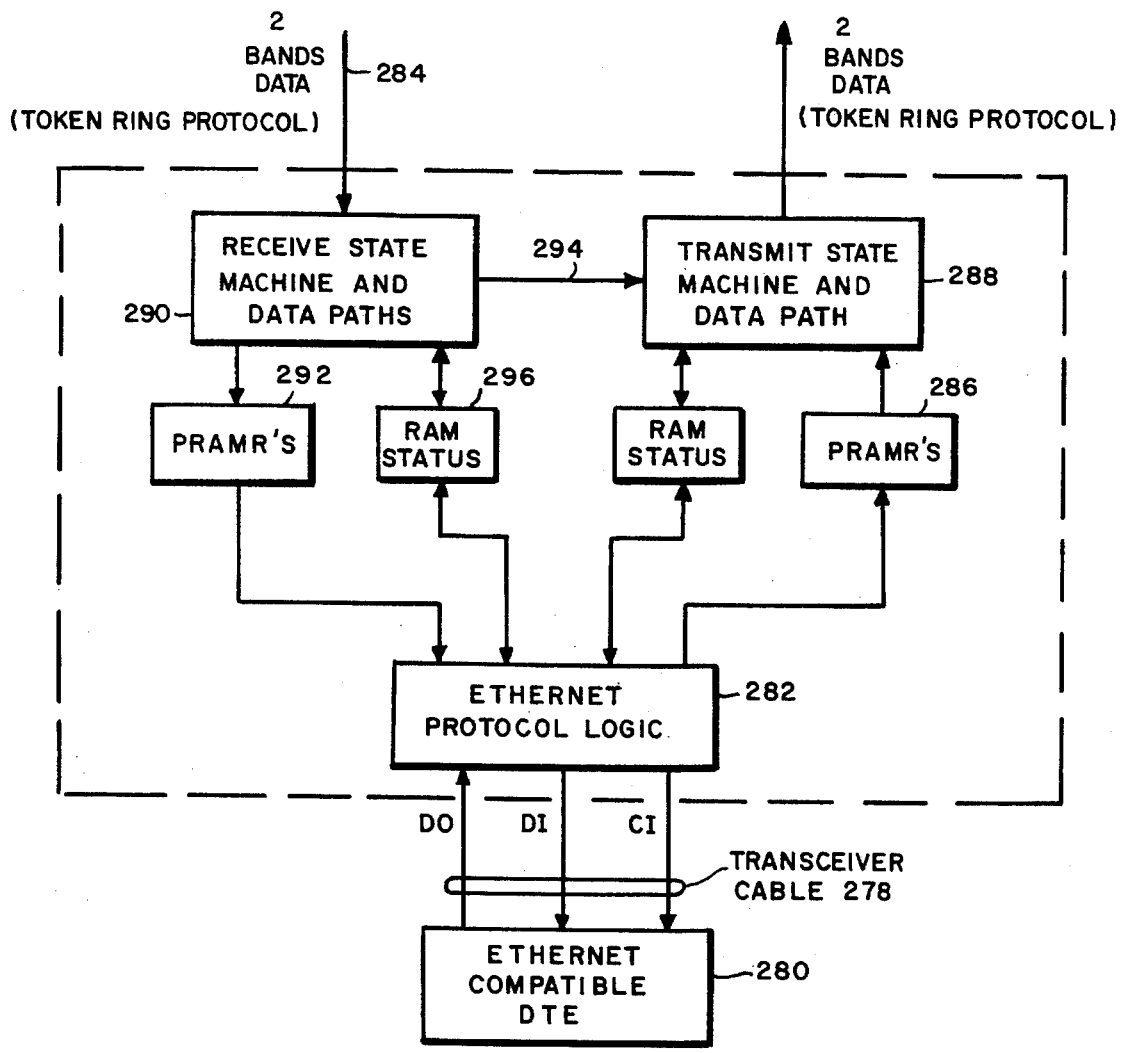
FIG. 14 is a block diagram of an Ethernet accelerator node.

Referring to FIG. 14, in an Ethernet accelerator node the node circuitry 138 communicates over a transceiver cable 278 with the IEEE 802.3 or Ethernet-compatible DTE 280 by means of the usual protocol-specified signals. Data is fed out of DTE 280 in packets using data out (DO) signals. Data is fed into DTE 280 in packets using data in (DI) signals. Packet collisions are indicated to DTE 280 by collision indicator (CI) signals.

Figure 15:
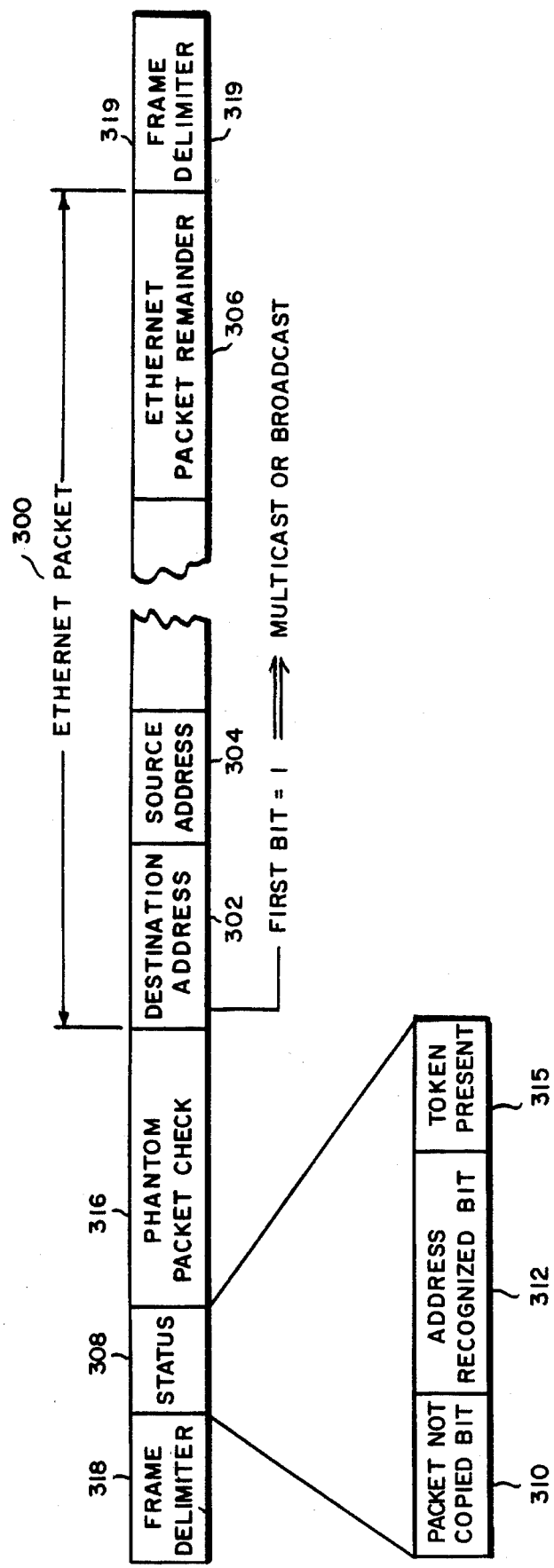
FIG. 15 is a chart of a token ring packet.

Referring to FIG. 15, each Ethernet packet 300 sent to or from DTE 280 includes a destination address 302 (whose first bit is set to one for a broadcast or multicast packet), a source address 304, and the packet data 306.

Referring again to FIG. 14, node circuitry 138 includes Ethernet protocol logic 282 to which the cable 278 is attached and which is arranged to assure that all signals passed to DTE 280 conform in all respects to the Ethernet protocol and all signals received from DTE 280 are interpreted in all respects in conformity with the Ethernet protocol. For example the signals are sent both ways using Manchester coding. Node circuitry 138 treats each Ethernet packet as part of a longer token ring type packet for purposes of communication between nodes in accordance with an append token scheme. One, two or four bands 284 of the main ring are assigned to handle the Ethernet-protocol communication and the token ring packets are sent in those bands. The node circuitry 138 adds the token ring information to each outgoing Ethernet packet and acts upon the token ring information in each incoming Ethernet packet.

Referring again to FIG. 15, the token ring information includes a status field 308 (which comprises a packet copied bit 310, an address recognized bit 312, and a token present bit 315), a token confirmation or phantom packet check field 316, and frame delimiter fields 318, 319 on either end of the packet.

Referring again to FIG. 14, an Ethernet packet received from DTE 280 is loaded into one of several packet sized random access transmit memories (PRAMT) 286. When the end of a packet is detected based on cessation of a clock derived from the Manchester encoded data stream, the PRAMT into which it has been loaded is marked full. Next a transmit state machine (and data paths) 288 picks up the Ethernet packet from the PRAMT and sends it as part of a token ring packet. The two Ethernet bands carry a continual succession of token ring packets around the ring. A token ring packet may not be in use at a given time as indicated by the token present bit 315. Other token ring packets are being used as indicated by the absence of the token present bit 315.

A receive state machine 290 (which receives the 2 Ethernet bands from register 136—FIG. 6) monitors the received packets. Those packets intended for its DTE are passed to a local PRAMR 292 for storage.

In order to send an Ethernet packet, transmit state machine 288 seizes the next available packet (one which contains an available token), resets the token present bit in field 316 and sets the phantom packet check value to 0000 or 1111, inserts the Ethernet packet into the token ring packet in field 300, and passes the token ring packet back to pass-through circuitry 142 for delivery to the network. The token ring packet then travels from one Ethernet node to the next Ethernet node around an Ethernet ring defined by the network management controller. The Ethernet ring will include the main ring and may include one or more local loops.

In each Ethernet node on the Ethernet ring, the receive state machine 290 compares the destination address in the Ethernet part of each token ring packet with the source address used by its associated DTE. If they match, the address recognized bit 312 is set, that token ring packet is stored in one of several packet-sized random access receive memories (PRAMR) 292, and the PRAMR is marked full via the RAM status unit 296. If no PRAMR is available to receive, the packet copied bit is reset. The token ring packet is also sent over to the transmit state machine via line 294 to be sent around the Ethernet ring again. Token ring packets stored in PRAMR are sent via logic 282 to DTE 280.

The source address used by receive state machine 290 to identify token ring packets intended for its DTE are obtained by copying the source address field 304 of the Ethernet packets transmitted by DTE 280. The source address fields of successive Ethernet packets received from DTE 280 are copied into alternating source address buffers (not shown). The newest copy is used by machine 290 beginning with the next token ring packet after the source address has been copied. Two octet or six octet addresses can be recognized but all Ethernet nodes using a given set of bands must be set by the network management controller to all recognize either one or the other.

All Ethernet packets with the first bit of the destination address set to one are intended to be transmitted to a group of Ethernet nodes (multicast) or all Ethernet nodes (broadcast). All such packets are copied by all Ethernet nodes into PRAMR and are subsequently transmitted to the DTEs. If the packet cannot be copied because all PRAMR are occupied, the receive state machine 290 resets the packet copied bit 310 before returning that packet to the ring.

The transmit state machine 288 retransmits token ring packets which it has sent but which have not been copied, up to a maximum number of retransmissions determined by the network management controller. When the maximum number has been reached or when the token ring packet has been copied (whichever comes first), the PRAMT containing the packet is marked empty. Similarly, when an Ethernet node which has copied a packet to PRAMR has transmitted the packet to the DTE with no collision (a simultaneous attempt by the DTE to transmit) the PRAMR containing the packet is marked empty. The node will not back off in the event of a collision but will only enforce the collision as required using CI by the standard interface specification. Therefore, the node will win the right to transmit in the event of a collision if the DTE is implemented according to the standard interface specification.

The transmit state machine always removes from the Ethernet ring those received packets which it had transmitted. In normal operation, the next packet received by a node after is has transmitted a packet is that transmitted packet. It recognizes its own packets by the value 0000 or 1111 which it inserts in field 316 when it transmitted the packet. The phantom packet check value (0000 or 1111) enables nodes to clear off the ring packets which should have previously been removed. For example, if a node is using the phantom packet check value 0000 and immediately after sending a packet it receives a packet having a check value 1111,it knows that that receiver packet is improperly on the ring, and it removes that packet and subsequent packets from the ring until it removes a packet with check value 0000.

The system uses an append-token scheme to send the Ethernet packets on the network. After a node has finished transmitting data, it sends a final packet that contains no data in field 300, but does contain an available token for use by any other node that wishes to transmit.

The bands assigned to serve the Ethernet protocol together provide a 24, 48, or 96 megabit per second highway, which allows many two-way communications to proceed between DTEs permitting them in effect simultaneously to use almost the entire 24, 48, or 96 megabits per second, even though any one Ethernet node may only be transmitting at no more than 10 megabits per second. Thus the Ethernet ring provides a bit transmission rate advantage of five to one over the usual 10 megabit per second Ethernet bus. Furthermore, the append token ring protocol used for the token ring packets uses the bands up to 25 times more efficiently than the collision detection Ethernet protocol, for a total bit transmission rate advantage of up to 250 times.

The network provides a number of independent, universal bands and channels, each of which can be assigned to carry data in accordance with any selected data communication protocol. The channels and bands can be combined and recombined to provide a variety of different bandwidths. Different channels and bands can simultaneously serve different protocols. Protocols such as 3270 and others which are time critical, can be served since each channel provides an available 2.694 megabit per second capacity and includes bit intervals that appear no less frequently than every 72nd bit. Th network can markedly enhance the performance of single-session type bus protocols (e.g., Ethernet CSMA/CD) by permitting high data rate communication of several messages at the same time. By handling network management control in a channel that is outside the data carrying bands, the band protocol demands are simplified and the network allows greater flexibility. Multiple level light modulation provides good DC balance and enables using a simple violation of the code to define frame boundaries. Phase synchronization accomodates variations caused by temperature and component delays. The hysteresis imposed by the phase synchronization limits continual, non-essential switching between sampling clocks.

Another protocol that can be served by the network is the IBM 3270 protocol in which up to 32 different 3270 DTEs are managed by a 3270 controller that sends polls, commands, and data to the various DTEs and receives status or data responses from them. Only one transmission can occur at a time. Each terminal transmits a response only (and always) after receiving a transmission from the 3270 controller. The responses must be received by the controller within 55 microseconds after the last bit of the 3270 controller transmission has occurred. By assigning a channel in one of the bands to serve the 3270 protocol, the bits of the 3270 channel are guaranteed to appear at the rate of 2.3587 megabits which assures that the terminal will be able to respond within the required time.

Other embodiments are within the following claims. For example, each channel can be further broken down into subchannels, each made up of one bit interval in each one of fewer than all of the blocks. The bit rate of the ring can be other that 194 megahertz.

We claim:

1. Network bridging circuitry for connecting one or more networks of a kind which carry digital data among a plurality of data generating and data using devices and are arranged to communicate in accordance with a collision detection protocol with one or more networks of a kind which carry digital data among a plurality of data generating and data using devices and are arranged to form a continuous closed ring and communicate in accordance with a non-collision detection protocol, the network bridging circuitry comprising:

protocol interface circuitry arranged to pass digital data from the network arranged in accordance with a collision detection protocol to the network arranged in accordance with a non-collision detection protocol and viceversa.

2. The network bridging circuitry of claim 1 wherein the non-collision detection protocol is a token ring protocol.

3. The network bridging circuitry of claim 1 wherein the network arranged to operate in accordance with a non-collision detection protocol is a fiberoptic network.

4. The network bridging circuitry of claim 2 wherein the collision detection protocol is a Ethernet or IEEE 802.3 protocol.

* * * * *